United States Patent [19]

Wyndham et al.

[11] 4,220,629
[45] Sep. 2, 1980

[54] CHLORINATION OF ORES WITH CATALYZED METAL CHLORIDES

[75] Inventors: Ronald Wyndham, New Orleans; Gervase M. Chaplin, Gretna; Alfred Lippman, Metairie, all of La.

[73] Assignee: Toth Aluminum Corporation, New Orleans, La.

[21] Appl. No.: 933,589

[22] Filed: Aug. 14, 1978

[51] Int. Cl.$^2$ .................. C01F 7/60; C01G 23/02; C01G 49/10
[52] U.S. Cl. .................. 423/76; 423/135; 423/149; 423/1; 423/60; 423/96; 423/97; 423/88; 423/107; 423/155
[58] Field of Search ............ 423/111, 135, 136, 75–79, 423/492, 493, 495, 491, 149

[56] References Cited

U.S. PATENT DOCUMENTS

| | | | |
|---|---|---|---|
| 2,758,019 | 8/1956 | Daubenspeck et al. | 423/75 |
| 3,244,509 | 4/1966 | Nowak et al. | 75/29 |
| 3,466,169 | 9/1969 | Nowak et al. | 423/136 |
| 4,083,927 | 4/1978 | Wyndham | 423/135 |
| 4,086,320 | 4/1978 | Martin et al. | 423/135 |
| 4,096,234 | 6/1978 | Martin et al. | 423/136 |

FOREIGN PATENT DOCUMENTS

| | | | |
|---|---|---|---|
| 608896 | 11/1960 | Canada | 423/79 |
| 1050324 | 2/1959 | Fed. Rep. of Germany | 423/75 |
| 305578 | 9/1929 | United Kingdom | 423/136 |

*Primary Examiner*—Herbert T. Carter
*Attorney, Agent, or Firm*—Holman & Stern

[57] ABSTRACT

The invention comprises a process for the manufacture of metal chlorides by the double-decomposition reaction between a metal chlorinating agent and a metal oxide having greater affinity for chlorine than does the oxide of the metal chloride, and in the presence of small amounts of boron chloride or functionally equivalent boron compounds that increase the rate and degree of completion of the reaction.

A major application of this invention is for the making by the chlorination of clay of aluminum chloride and alumina intermediates for the manufacture of aluminum metal.

$SiCl_4$ is formed in the carbo-chlorination of clay or other aluminous-siliceous ores. The $SiCl_4$ by this invention is catalyzed with $BCl_3$ and reacted with calcined clay to produce $AlCl_3$ and $SiO_2$. The practical use of $SiCl_4$ to make $AlCl_3$ thus eliminates the previous costly burden of waste $SiCl_4$ production.

20 Claims, No Drawings

CHLORINATION OF ORES WITH CATALYZED METAL CHLORIDES

BACKGROUND OF THE INVENTION

Carbo-chlorination has been utilized for the extraction from ores of metal values like aluminum, titanium and zirconium as volatile chlorides. Many otherwise useful ores have an excessive silica content which also carbo-chlorinates to form silicon tetrachloride and in the process consumes costly carbon, increases the volume of gases hence size and cost of plant equipment; has required costly refrigeration energy for its collection due to its high volatility (60° C.b.p.); and the recovery of its chlorine content is mandatory and that could be accomplished heretofore only by oxidation which consumes high-energy oxygen while posing difficult equipment problems at the 900°–1000° C. temperature of oxidation in the presence of chlorine an oxygen. Furthermore, the silica formed by the oxidation is very fine, hard to collect from the corrosive chlorine gases and poses a disposal problem due to its 5–10 lbs. per cubic foot bulk density.

Therefore, high silica ores have not been carbo-chlorinated on a large commercial scale due largely to the high costs and problems due to the $SiCl_4$ co-production.

The instant invention by reacting the $SiCl_4$ with metal oxides at a practical speed and degree, economically makes useful metal chlorides from the previously detrimental $SiCl_4$.

The instant invention therefore economically and uniquely utilizes $SiCl_4$ thus opening the way for the beneficiation by chlorination of many silica-containing ores. The valuable metals as oxides in the ore are converted ordinarily to metal chloride vapors by this invention and then, with or without purification, are sold as such or converted to their respective valuable oxides or metals.

A most urgent need for the instant invention is in the manufacture of aluminum metal. There are two methods now used to make that metal. The first method is the old Hall electrolytic process in which pure aluminum oxide is dissolved in molten cryolite and then electrolyzed to make the metal. The second method is the new Alcoa smelting process to which alumina is chlorinated to make aluminum chloride which is then mixed with conductive metal chlorides and electrolyzed to make aluminum metal and chlorine, the latter is being recycled.

The alumina used for commercial aluminum production by either of the above processes has been made exclusively by the old Bayer process which uses only high grade bauxites, the supply of which is limited and occurs in only a relatively few countries. On the other hand, there is a limitless and widespread supply of clay over the face of the earth but there have been no commercial plants built and only one patent issued for making pure metallurgical grade alumina or $AlCl_3$ by carbo-chlorination of clay. The co-chlorination of silica with the alumina in clay obviously has been a major drawback to clay use.

The assignee of the instant invention has been active in developing improvements in the chlorination of aluminous ores, such as U.S. Pat. No. 4,083,923 which describes a complete process of making metallurgical grade alumina by carbo-chlorination of kaolinitic clay and which has been issued as the first such complete proces patent; U.S. Pat. No. 4,082,833, which covers the use of sulfur catalyst to improve clay chlorination rates and yields. However, these processes carbo-chlorinate the silica as well as the alumina in the clay with the usual economic and energy penalty.

In view of the aforementioned detriments associated with chlorination of silica, there naturally has been some research directed to suppressing the chlorination of silica in clay. For instance, U.S. Pat. No. 1,866,731 to Staib and British Pat. No. 305,578 teach that the recycling of silicon tetrachloride along with chlorine fed to the clay in the carbo-chlorinator gives virtual elimination of net $SiCl_4$ production. However, Staib does not teach the use of $BCl_3$ as a catalyst to increase the reactivity of $SiCl_4$. Also Staib uses a large excess of $SiCl_4$ to repress further $SiCl_4$ formation, reportedly by the law of mass action, and, furthermore, the chlorinating agent is elemental chlorine with carbon as a reductant. In the instant invention, on the other hand, the chlorinating agent is the metal chloride $SiCl_4$ activated by small amounts of $BCl_3$ without any form of reductant. Also, this prior art process apparently never has been used commercially presumably because of inoperability indicated by actual laboratory tests.

Other references cited below involve the reduction in the chlorination of silica in clay carbo-chlorination by means of catalysts. But here again, the carbo-chlorination reaction is used with elemental chlorine as the chlorinating agent and with reductant necessary. Applicants, on the other hand, use a different double-decomposition reaction (not a carbo-chlorination) in which metal chloride, $SiCl_4$, is the chlorinating agent and reductant is not used.

None of the following prior art references shows or suggests applicant's use of $BCl_3$ as a catalyst for $SiCl_4$ in a separate double displacement reaction with clay or metal oxides.

Reference cited are:

Arne Landsberg, Metal. Trans. B, Vol. 8B, Sept., 1977 page 435–441. NaCl is used as a catalyst to reduce chlorination of $SiO_2$ in carbo-chlorination of clay. Significantly, Landsberg also contacted $SiCl_4$ with calcined clay with and without NaCl. He observed only $FeCl_3$ evolved and found the treated clay to react much more slowly in subsequent carbo-chlorination.

Russian references Ya. E. Seferovich, J. Chem Ind. (Moscow) No. 10 (1934) 62-4 and E. I. Krech, J. of General Chemistry (USSR) 7 Paper #8, pp 1249–63 (1937) mention means to preferentially chlorinate alumina over silica in clay but by the use of catalysts ($Na_2B_4O_7$, NaCl) in the carbo-chlorination reaction.

Assignee's allowed U.S. Application Ser. No. 814,834 and U.S. Pat. No. 4,083,927 also cover catalysts for silica suppression during carbo-chlorination, namely, alkali metal oxyanions and boron compounds, respectively.

However, all carbo-chlorinations with or without silica-suppressing catalysts produce considerable amounts of $SiCl_4$, usually representing 15–95% of the silica in the clay, so the instant invention would apply to recover values from the $SiCl_4$ in the gaseous products of those carbo-chlorinations.

Of course, it has been well known that $SiCl_4$ reacts as a chlorinating agent with metal oxides according to the oxide-chlorine affinity series.

Nowak, U.S. Pat. No. 3,244,509 discloses the use of $SiCl_4$ to purify ore of $Fe_2O_3$ by converting $Fe_2O_3$ to $FeCl_3$ and another Nowak U.S. Pat. No. 3,466,169 shows the $SiCl_4$ reaction with alumina. However, neither of these reference refers to $BCl_3$ catalyst with the $SiCl_4$ to react with clay or other oxides.

In summary there are no references in the prior art that show improvement, by the use of $BCl_3$ catalyst, in the rate and degree of the double decomposition reaction between a metal oxide and a metal chloride chlorinating agent like $SiCl_4$.

SUMMARY OF THE INVENTION

The invention comprises the double-decomposition reaction between a metal chloride chlorinating agent and a metal oxide having greater affinity for chlorine than does the oxide of the metal chloride agent and in the presence of small amounts of boron chloride or functionally equivalent boron compounds that increases the rate and degree of completion of the reaction. The double decomposition chlorination reaction is illustrated by this equation:

$$YO_2 + ZCl_4 \rightarrow YCl_4 + ZO_2$$

The reaction proceeds because $YO_2$ has a greater affinity for chlorine than does $ZO_2$; or $YO_2$ is higher in the metal oxide-chlorine affinity series than $ZO_2$. The rank in the series is established by thermodynamic calculations.

The preferred application of the invention is for the production of virtually only $AlCl_3$ instead of $AlCl_3$ and $SiCl_4$ in the chlorination of clay. The clay is conventionally carbo-chlorinated to $AlCl_3$ with even greater amounts of $SiCl_4$ as the serious economic detriment previously described. By the proces of the instant invention, that silicon chloride catalyzed with $BCl_3$ is effectively reacted principally with the alumina component of fresh calcined clay so that substantially only $AlCl_3$ (with small amounts of $TiCl_4$ and $FeCl_3$) is the net product rather than $SiCl_4$ and $AlCl_3$. Offgases from the clay carbo-chlorination containing $SiCl_4$ can be directly reacted with calcined clay in the presence of $BCl_3$ catalyst or the $SiCl_4$ can be separated in whole or part from the gas stream and then reacted with clay in the manner of this invention.

It is obvious that this invention will apply also to catalyze other metal chlorides than $SiCl_4$ to make them more active chlorinating agents for metal oxides. $TiCl_4$ for instance, is similar to $SiCl_4$ in properties and would be similarly catalyzed by $BCl_3$.

DESCRIPTION OF THE PREFERRED EMBODIMENT(S)

The present invention broadly comprises the chlorination of a metal oxide by a metal chloride chlorinating agent in the presence of boron trichloride to produce a metal chloride from the original oxide; and an oxide from the original metal chloride. The boron trichloride can be mixed as such with the chlorinating agent or introduced as functionally equivalent boron-containing compounds.

The preferred embodiment is the reaction of calcined kaolin clay with silicon tetrachloride as given by the following double-decomposition equation for the major alumina component of the clay.

$$2(Al_2O_3 \cdot 2SiO_2) + 3SiCl_4 = 4AlCl_3 + 7\ SiO_2$$

It has been found that the above chlorination is very slow and incomplete even at the maximum permissible reaction temperature of 1000° C. (clay forms refractory compounds at higher temperatures). The rate and degree of reaction are greatly enhanced by the addition to the reaction of small amounts of boron trichloride and/or functionally equivalent boron-containing compounds.

The mechanism by which boron compounds act as catalysts or reaction promoters in the above chlorination reactions has not been fully established, but it seems from tests that any boron compound that will form boron trichloride in the reaction zone will qualify as catalyst or promoter. Boron compounds that will chemically combine with silicon tetrachloride to yield boron trichloride would be reaction promoters or catalysts.

The following boron compounds would be effective as they would form $BCl_3$ with $SiCl_4$ in the chlorinator: boron oxide, boric acid, sodium borate, aluminum borate, or the like. Boron trichloride is usually preferred as it is readily purchased or produced for makeup and it is recycled in the system so its use would avoid making changes in composition of the boron catalyst.

$BCl_3$ is a vigorous chlorinating agent for most oxides like those in clay:

| | |
|---|---|
| $Al_2O_3 + 2BCl_3 = 2AlCl_3 + B_2O_3$ | Equation 1 |
| $3TiO_2 + 4BCl_3 = 3TiCl_4 + 2B_2O_3$ | Equation 2 |
| $Fe_2O_3 + 2BCl_3 = 2FeCl_3 + B_2O_3$ | Equation 3 |
| $2B_2O_3 + 3SiCl_4 = 4BCl_3 + 3SiO_2$ | Equation 4 |

According to one proposed theory, the reaction promotion by $BCl_3$ could be caused by fast initial reactions with the metal oxides as shown in equations (1), (2), (3) to release the respective metal chlorides and make $B_2O_3$ which in turn would react with $SiCl_4$ (equation (4)) to regenerate $BCl_3$ and deposit $SiO_2$. Since $B_2O_3$ is a fluxing and complexing agent, it could well promote ion mobility and reactivity at the reaction interfaces. On the other hand, the $BCl_3$ might complex with the $SiCl_4$ then dissociate in the reaction zones to provide some free radicals that react more rapidly. This invention is not to be limited by any of the aforelisted explanations.

By-products $FeCl_3$, $TiCl_4$ and some trace metal chlorides also are produced by reaction of the $SiCl_4$ with their respective oxides. The titanium tetrachloride is a readily salable, valuable high tonnage item while the iron chloride can be sold as such for sewage treatment or oxidized to make pigments or feed for making pure iron metal.

Some types of ores that could be carbo-chlorinated to make some $SiCl_4$ that would be advantageously utilized by the practice of this invention are:

Aluminum silicates like kaolinitic clays, haloysite, feldspars, ball clays, fire clays, coal shales and slates; nepheline syenites; fly and other ashes from combustion of fuel; aluminum oxides as siliceous bauxites, laterites, and aluminous and other ores containing silica or siliceous minerals.

Also, other applicable ores would comprise those valuable with metals as oxides along with silica or siliceous compounds, said metal oxides being carbo-chlorinateable.

The $SiCl_4$ would react with the following ores or oxides, as examples, to make silica and more valuable metal chlorides.

Most preferred are calcined kaolinitic clay and other aluminum silicates reactive with catalyzed $SiCl_4$. Others: reactive transition aluminas like amorphous, gamma, eta or chi phases; and ores containing oxides, silicates or other compounds of the following metals and reactive with catalyzed $SiCl_4$: Mo, Al, Cr, Zr, Ti, Fe, Mg, Sn, As, Co, Ni, Sb, Zn, Mn, Bi, Cd, Cu, Pb, Hg.

Furthermore, the chloride of any of the metals listed in the table following can chlorinate the metal in any of the oxides listed later in the table. The list shows the relative chlorine affinity of metal oxides. Accordingly, the instant invention includes any chlorination of a metal oxide in which the metal chloride chlorinating agent is catalyzed by $BCl_3$ or functionally equivalent boron compounds to increase chlorination rates or yields. For instance, $TiCl_4$ would react more rapidly and completely with any of the oxides following it in the list in the presence of $BCl_3$.

The double decomposition chlorination reaction of the present invention is exemplified with $BCl_3$ catalyzed $SiCl_4$ as the chlorinating agent with calcined kaolinitic clay in the following working examples wherein all parts and percentages are by weight unless otherwise specified.

EXAMPLE 1

A readily available Georgia kaolinitic clay containing on a dry basis, 38% $Al_2O_3$, 44% $SiO_2$; 1.5% $Fe_2O_3$; 2.5% $TiO_2$ and 14% $H_2O$, was first dried at 140° C. to remove free moisture and thereafter was ground to about −200 mesh (Tyler series). A charge of about 23 gms of the dry clay was calcined in a 40 mm diameter batch fluid bed reactor at 900° C. for 20 mins. under a purge of 400 cc/min argon to remove all free and chemically bound water. After 20 mins., the argon gas was directed through a flask containing liquid $SiCl_4$ then into the reactor. $SiCl_4$ was thus vaporized into the argon stream at a rate of 0.265 gms $SiCl_4$ per min. for 60 min. After the stated reaction time, the reaction mass was cooled, weighed and analyzed for residual metals from which the conversion of metal oxides was calculated.

Examples 2, and 3 employed exactly the same clay, apparatus and conditions for calcination as in Example 1. In chlorination there were small differences in the rates of $SiCl_4$ evaporated into the argon. The big difference between Example 1 versus Examples 2 and 3 was the introduction in Examples 2 and 3 of $BCl_3$ gas into argon gas stream in addition to the $SiCl_4$. Example 3 employed much more $BCl_3$ gas than Example 2. Conditions were virtually identical in all other respects.

Results were tabulated in Table I.

TABLE I

DATA ON TEST CONDITIONS AND CONVERSIONS

| A | B | C | D | E | F | G | H | I | J | K | L | M |
|---|---|---|---|---|---|---|---|---|---|---|---|---|
| | | | | | | | INCREASE IN CONVERSION FROM $BCl_3$ | | | | | |
| | | | | | | | $Al_2O_3$ | | $TiO_2$ | | $Fe_2O_3$ | |
| | Argon flow-rates | $SiCl_4$ feed rate | $BCl_3$ feed rate | | % CONVERSION | | Dif. in | | Dif. in | | Dif. in | |
| Example | cc/min | gms/min | gms/min | $Al_2O_3$ | $TiO_2$ | $Fe_2O_3$ | Conv. | Ratio | Conv. | Ratio | Conv. | Ratio |
| 1 | 400 | 0.265 | 0 | 6.1 | 10.0 | 91.1 | — | — | — | — | — | — |
| 2 | 400 | 0.273 | 0.0183 | 39.0 | 100.0 | 100.0 | 32.9 | 6.4 | 90.0 | 10.0 | 8.9 | 1.1 |
| 3 | 400 | 0.290 | 0.0915 | 44.0 | 100.0 | 100.0 | 37.9 | 7.2 | 90.0 | 10.0 | 8.9 | 1.1 |

Example of calculations:
(H-2)=(E-2)−(E-1)=39−6.1=32.9%
(I-2)=(E-2)/(E-1)=39.0/6.1=6.4
Other columns are similarly calculated.

Table II provides certain compositions and ratios calculated from the data in Table I in order to establish the effect of variables and the applicable limits of reagents and catalysts.

TABLE II

CONCENTRATION AND RATIOS OF REAGENTS AND CATALYST.

| A | B | C | D | E | F | G | H | I |
|---|---|---|---|---|---|---|---|---|
| | | | Gas Composition | | $BCl_3$ to | $BCl_3$ to | $SiCl_4$ to | $SiCl_4$ fed, % stoich. |
| Example No. | Item | ccs/min | % by volume | % by weight | $SiCl_4$ weight ratio | dry clay weight ratio | dry clay weight ratio | on $Al_2O_3$ in dry clay |
| 2 | Argon | 400 | 91.0 | 71.0 | | | | |
| | $SiCl_4$ | 36.0 | 8.2 | 27.2 | | | .71 | 75.0% |
| | $BCl_3$ | 3.5 | 0.8 | 1.8 | .067 | .048 | | |
| | Total | 439.5 | 100.0 | 100.0 | | | | |
| 3 | Argon | 400 | 87.8 | 65.2 | | | | |
| | $SiCl_4$ | 38.2 | 8.4 | 26.5 | | | .76 | 79.6% |
| | $BCl_3$ | 17.5 | 3.8 | 8.3 | .316 | .239 | | |
| | Total | 455.7 | 100.0 | 100.0 | | | | |

Certain observations from the above tables are significant.

$TiO_2$—The effectiveness of this invention for the chlorination of $TiO_2$ is apparent; it chlorinated 10 times faster when $BCl_3$ catalyst was used.

$Fe_2O_3$—The relatively little effect of $BCl_3$ catalyst on chlorination of $Fe_2O_3$ can be attributed to the fact that the form of iron as found in clay is so quickly chlorinated without a catalyst that the effect of a catalyst would be small. However, other forms of $Fe_2O_3$ and most metal oxides above $SiO_2$ in the chlorine affinity series would chlorinate more slowly so the catalyst would play an important part in improving the reaction rate and degree.

1. $BCl_3$ concentration.

Even with the $BCl_3$ at only 0.9% by volume (1.9% by weight) in the feed gas stream, its effect was to increase the reaction rates or yields with $Al_2O_3$ and $TiO_2$ about 6–10 times. Considerably less $BCl_3$ obviously would be quite effective because about a five-fold increase in its concentration (Example 3 vs. 2) caused only a relatively small increase in the reaction rates and yields. The profound effect of only a fractional volumetric percentage of $BCl_3$ was indeed unexpected, and established the unique catalytic effect of $BCl_3$. The $BCl_3$ is effective in practical concentrations from about 0.2% to 12% by weight of the feed gas stream depending on the concentration of the $SiCl_4$ and other conditions during the reaction. The preferred range is about 0.5%–7% by weight of the gas stream.

2. The weight ratio of $BCl_3$ to $SiCl_4$ varied from 0.067 to 0.316; the former was effective and the latter appeared in excess. At the lower end, a $BCl_3/SiCl_4$ ratio of about 0.01 would be effective especially with higher concentrations of $SiCl_4$. At the high end, a $BCl_3/SiCl_4$ ratio of 0.40 would be practical. The higher ratios would be especially useful with low concentrations of $SiCl_4$ to maintain an adequate concentration of $BCl_3$ in the total stream.

Accordingly, the range of $BCl_3/SiCl_4$ would be 0.01–0.40 with the preferred range of 0.03–0.20.

3. $SiCl_4$ Concentration $SiCl_4$ concentration in the feed gas stream was only 8.2% by volume, amazingly reactive when catalyzed, as there was relatively poor contact with the clay due to the low concentration. In commercial practice, the concentration of the $SiCl_4$ could be considerably increased if necessary. The $SiCl_4$ concentration can be varied from about 10% to about 100% by weight of feed gas under the scope of this invention.

4. The ratio of $BCl_3$ to dry clay varied from 0.048 to 0.239, with usable range of about 0.01 to about 0.4, preferred range of about 0.03 to about 0.2.

5. Stoichiometry of $SiCl_4$ to $Al_2O_3$ in clay.

It is significant that the weight ratio of $SiCl_4$ to $Al_2O_3$ in dry clay was about 1.9 or about 76% of stoichiometric for conversion of all the $Al_2O_3$ in the dry clay charge, so, considering the demand for $SiCl_4$ for reaction with the $TiO_2$ and $Fe_2O_3$, there was not enough $SiCl_4$ fed to completely convert the $Al_2O_3$. The significance of these comments is that better conversion of both $SiCl_4$ and of $Al_2O_3$ in clay could be expected commercially as by use of countercurrent reactors and better contact of the $SiCl_4$ with the clay.

Demonstation of Two-stage Chlorination Process

The examples below demonstrate the effect of $BCl_3$ catalyst in the second stage of a 2-stage chlorination process. In the first stage, the conditioned clay was carbo-chlorinated to produce offgases containing primarily $AlCl_3$, $SiCl_4$ and carbon oxides which were then passed through a second stage containing conditioned clay. The $SiCl_4$ reacted with the $Al_2O_3$ in the clay to make $AlCl_3$ and $SiO_2$. The effect of $BCl_3$ on the reaction of $SiCl_4$ in the second stage is obvious.

EXAMPLES 4, 5 and 6

A series of two stage chlorination experiments were carried out to show the effect of the double displacement reaction with and without $BCl_3$ catalysts in the second stage and also to establish desirable concentrations of $BCl_3$ catalyst. The first step comprised carbo-chlorination of clay using sulfur as the catalyst, and in the second step the hot offgases from the first reactor were passed into a second reactor containing 200 mesh calcined clay and into which $BCl_3$ gas catalyst was introduced to mix with the hot gases.

Description of the Tests

Two 40 MM ID vertical fused quartz tubes each fitted with a medium quartz fritted disc were connected together with a 40 MM Pyrex tube (transition tube) to which a tube was connected for introduction of the $BCl_3$ gas catalyst. A tube connected the first reactor to supplies of nitrogen, chlorine, $H_2S$, or $BCl_3$ gases.

Shell heaters were placed around the quartz reactors and a heater tape was wrapped around the transition tube. The two reactors were heated to 900° C. and the temperature controlled by means of a thermocouple and a digital readout potentiometric controller 31 gms of a mix containing calcined clay and approximately 35% lignite char was added to the first reactor under a stream of 250 ccs/min $N_2$. The transition tube was connected to the first and second reactors and heated to 300° C. Into the second reactor 30 gms of calcined clay was added. A cold condenser and a scrub containing caustic soda solution were connected to the second reactor. When both reactor temperatures had lined out at 900° C. the nitrogen purge was removed and chlorine at 100 ccs/min and $H_2S$ catalyst at 5 ccs/min were introduced into the first reactor and at the same time $BCl_3$ at stated controlled rate was introduced into the transition tube to the second reactor in Example 5 as shown in the following Table 3. For Example 6 of that Table, the $BCl_3$ was introduced along with chlorine and $H_2S$ into the first reactor. The experiment was allowed to proceed for approximately 2 hours and the $Cl_2$, $H_2S$ and $BCl_3$ flows were stopped. $N_2$ was introduced, and the reactors allowed to cool. After cooling, the apparatus was disassembled and the residues, condenser and scrub were measured and analyzed. The results of the experiments are shown in the following Table 3.

TABLE 3

| EXAMPLE # | 1st REACTOR | | 2nd REACTOR | | GAS COMPOSITION Entering 2nd Reactor | | |
|---|---|---|---|---|---|---|---|
| | MIX | CATALYST ADDED | SOLID | CATALYST ADDED | % $SiCl_4$ | % $BCl_3$ | % $SiCl_4$ |
| | | | | | By Weight | | Utilized in Second Reactor |
| 4 | Clay + Carbon + Chlorine | $H_2S$ | Clay | 0 | 12 | 0 | 17 |
| 5 | Clay + Carbon + Chlorine | $H_2S$ | Clay | $BCl_3$ | 18 | 2 | 53 |
| 6 | Clay + Carbon | $H_2S$ | Clay | — | 14 | 0.9 | 59 |

TABLE 3-continued

| | 1st REACTOR | | 2nd REACTOR | | GAS COMPOSITION Entering 2nd Reactor | | |
|---|---|---|---|---|---|---|---|
| EXAMPLE # | MIX | CATALYST ADDED | SOLID | CATALYST ADDED | % SiCl$_4$ By Weight | % BCl$_3$ | % SiCl$_4$ Utilized in Second Reactor |
| | + Chlorine | + BCl$_3$ | | | | | |

The above tests showed the powerful effect of BCl$_3$ in the second step and that a BCl$_3$ concentration as low as 0.9% of the gas stream was as effective as 2%.

The effect of other variables is discussed below.

Particle Size

The particle size used in the above tests was −200 mesh, obtainable readily in hammer, impact, ball and other types of mills, but other particle sizes might be desirable for different types of apparatus. The smallest practical particle size should be used to expedite the reaction rate.

Calcination

In the best practice of this invention, the clay must be properly calcined to make it adequately reactive with the catalyzed SiCl$_4$. The conditions for calcination of clay for this invention are in a temperature range of 600°–950° C., preferably 790°–950° C. and flash calcined (sudden exposure to the operating temperature to cause the clay stacks to open up for better diffusion of gas). This practice also reduces the time of exposure of the clay so would tend to avoid the reduction of clay activity due to overheating above about 975° C. The clay should be calcined, preferably to reduce the loss on ignition from combined water, to below 0.5%, preferably to 0, to avoid formation of HCl.

Gas reducing conditions in calcination are usually beneficial. Some conditions for calcining clay have been set forth in the examples but patent application Ser. No. 814,834 and U.S. Pat. No. 4,083,927 describe methods for calcining clay under conditions and/or in the presence of additives (sulfur, borates, alkali metal oxyanions, and flash reducing calcination) to make the clay more reactive. The instant invention includes the use of such more reactive calcined clays for the reaction with catalyzed SiCl$_4$.

Form of and Incorporaton of Catalyst

As previously mentioned, the boron catalyst can be added not only as BCl$_3$ to the SiCl$_4$ gas stream or reactor, but also as previously indicated functionally equivalent boron compounds added to the clay before or after calcination with or without grinding together or use of other bonding means such as binders, balling, briquetting, pressing, etc. The clay or clay-catalyst mix could be comminuted as desired after calcination.

Pressure

The process can be operated well under atmospheric pressure or under higher pressure, to reduce size and cost of equipment. The process can be carried out, for instance, at an absolute pressure of about 10 to about 200 pounds per square inch.

Temperature

The process is applicable to the chlorination of a large number of metal oxides with their corresponding chlorides having a wide range of boiling points; for instance: metal chlorides made from oxides of metals listed on the bottom of page 6 have boiling points ranging from 110° to 1000° C. The amount of metal chloride vaporized would be determined by the vapor pressure at the temperature of chlorination and the amount and composition of gases passing through the chlorinator.

However, the activation energy for most of these reactions demands a temperature of at least about 500° C. Hence, the broad temperature range is about 500°–1000° C. For the reaction of catalyzed SiCl$_4$ and calcined clay, the range would be 800°–1000° C. with a preferred range of about 850°–950° C.

Apparatus

To accomplish the best operation of this process, there are fortunately many types of commercial apparatus available, such as shaft furnaces; fluid, static and fast bed reactors; rotary kilns; solid-gas contactors, rabbled hearth furnaces and the like, and which can be operated batchwise, continuously or semi-continuously, counter-currently or concurrently. There are commercially available construction materials to contain the reaction that will last and not contaminate the products.

This invention applies not only to the catalysis with BCl$_3$ of SiCl$_4$ as a chlorinating agent for metal oxides but also the catalysis of other metal chlorides than SiCl$_4$, to increase the reactivity of those other metal chlorides as metal oxide chlorinating agents. TiCl$_4$ is one other example thereof, but other metal chlorides catalyzed in reactivity by BCl$_3$ as metal oxide chlorinating agents, would also clearly fall within the scope of the instant invention.

By definition, an ore is a mineral from which the metal values can be profitably extracted. The term ore as used herein is intended to include refined as well as raw or native minerals and oxides. Because of the present process, metal values can now be recovered economically from many ores heretofore commercially unattractive because of their high siliceous content and/or because of the lack of a method to make waste metal chlorides like SiCl$_4$ usable as an effective chlorinating agent for the metal values in useful ores. A current striking need involves the more attractive chlorination of various aluminous ores including clays, bauxites and others previously listed herein, for the production of alumina, aluminum chloride and aluminum metal. Hence, this unique invention not only profitably utilizes a previously detrimental waste by-product but simultaneously opens up the economic extraction of metal values from many deposits that could not be gainfully exploited without the instant invention.

Incidental Advantages

The apparatus required for the reaction of BCl$_3$-catalyzed SiCl$_4$ with a metal oxide would serve still another purpose. Any carbon monoxide and chlorine evolved from an incomplete reaction in the prior carbochlorination step would react with metal oxide in the apparatus in which the catalyzed SiCl$_4$ was reacted, thus better utilizing reductant, reducing or eliminating costs of recycling corrosive chlorine, further improving the yield of alumina and reducing the volume of gas flow after condensation of AlCl₃ and thus lessening of overall process costs. Appropriate amounts of chlorine or of reductant could be introduced into the second step to cause a balance between them for best utilization of both reagents.

What is claimed is:

1. A process of producing aluminum chloride, titanium chloride, and iron chloride from a calcined aluminous ore containing aluminum oxide, titanium oxide, and iron oxide comprising subjecting the calcined aluminous ore to a decomposition reaction with silicon tetrachloride at a temperature of from about 500° C. to about 1000° C. in the presence of boron trichloride or a boron compound that will form boron trichloride in the reaction in an amount of from 0.01 to 0.4 on a weight ratio to the silicon tetrachloride wherein a reductant is not used, thereby to produce aluminum chloride, titanium chloride, and iron chloride.

2. The process of claim 1 wherein the calcined aluminous ore is calcined kaolinitic clay.

3. The process of claim 1 wherein the calcined aluminous ore is calcined bauxite.

4. The process of claim 1 wherein the calcined aluminous ore is calcined ferruginous bauxite.

5. The process of claim 1 wherein the calcined aluminous ore is calcined siliceous bauxite.

6. The process of claim 1 wherein the silicon tetrachloride used is a component of the offgases resulting from the carbo-chlorination of an aluminous and siliceous ore.

7. The process of claim 6 wherein calcined kaolinitic clay is the source of the aluminous and siliceous ore for carbo-chlorination and for the chlorination with silicon tetrachloride and boron trichloride or the boron compound that will form boron trichloride in the reaction.

8. The process of claim 7 wherein the weight ratio of the boron trichloride to silicon tetrachloride is about from 0.03 to 0.20, and the temperature of the double decomposition reaction is about from 850° C. to 950° C.

9. The process of claim 8 wherein the chlorination is carried out at an absolute pressure of about from 10 to 200 pounds per square inch.

10. The process of claim 6 wherein the offgases containing silicon tetrachloride also contain boron trichloride in a concentration of about from 0.2 to 12% by weight.

11. The process of claim 1 wherein the silicon tetrachloride is a component of the offgases resulting from the carbo-chlorination of calcined kaolinitic clay using sulfur or a functionally equivalent catalyst and the aluminous ore reacting with the boron trichloride-catalyzed silicon tetrachloride is calcined kaolinitic clay.

12. The process of claim 1 wherein the silicon tetrachloride is a component of the offgases resulting from the carbo-chlorination of calcined kaolinitic clay using sulfur or a functionally equivalent catalyst and the aluminous ore reacting with the boron trichloride-catalyzed silicon tetrachloride is calcined bauxite.

13. The process of claim 1 wherein the silicon tetrachloride is a component of the offgases resulting from the carbo-chlorination of calcined kaolinitic clay using sulfur or a functionally equivalent catalyst and/or boron trichloride or a functionally equivalent catalyst, and the aluminous ore reacting with the boron trichloride-catalyzed silicon-tetrachloride is calcined bauxite or calcined kaolinitic clay.

14. The process of claim 1 wherein the silicon tetrachloride is a component of the offgases resulting from the carbo-chlorination of calcined siliceous bauxite using sulfur or a functionally equivalent catalyst, and the aluminous ore reacting with the boron trichloride-catalyzed silicon tetrachloride is calcined bauxite.

15. The process of claim 1 wherein the silicon tetrachloride is generated in a preliminary step by carbo-chlorination of calcined aluminous-siliceous ore.

16. The process of claim 15 wherein the calcined aluminous ore is calcined kaolinitic clay.

17. The process of claim 15 wherein the calcined aluminous ore is calcined bauxite.

18. The process of claim 15 wherein the calcined aluminous-siliceous ore is calcined kaolinitic clay.

19. The process of claim 15 wherein the boron trichloride is introduced in the carbo-chlorination step.

20. The process of claim 15 wherein the boron trichloride catalyst is introduced into the reaction between the aluminous ore and the silicon tetrachloride.

* * * * *